United States Patent [19]

Caputo

[11] 4,286,222
[45] Aug. 25, 1981

[54] TIMING WAVEFORM GENERATOR

[75] Inventor: William R. Caputo, Wyckoff, N.J.

[73] Assignee: Westinghouse Electric Corp., Pittsburgh, Pa.

[21] Appl. No.: 61,531

[22] Filed: Jul. 27, 1979

[51] Int. Cl.³ ............................................. H03K 12/00
[52] U.S. Cl. .................................... 328/155; 307/262; 328/29; 328/63; 328/164; 340/658
[58] Field of Search ...................... 328/28, 29, 63, 74, 328/155, 164, 8; 307/261, 262, 269, 293; 324/83 R; 340/658

[56] References Cited

U.S. PATENT DOCUMENTS

| 3,636,379 | 1/1972 | Moe et al. | 328/155 X |
|---|---|---|---|
| 3,713,011 | 1/1973 | Johnson et al. | 318/257 X |
| 3,750,850 | 8/1973 | Winkler et al. | 187/29 R |
| 3,909,717 | 9/1975 | Gazzano | 328/28 X |
| 3,958,131 | 5/1976 | Mozdzer | 328/28 X |
| 4,030,570 | 6/1977 | Caputo | 187/29 R |
| 4,052,679 | 10/1977 | Hosoya | 307/262 X |
| 4,155,427 | 5/1979 | Caputo et al. | 187/29 R |

FOREIGN PATENT DOCUMENTS

| 826618 | 1/1960 | United Kingdom . |
| 1186885 | 4/1970 | United Kingdom . |
| 1338980 | 11/1973 | United Kingdom . |
| 1400576 | 7/1975 | United Kingdom . |
| 1403929 | 8/1975 | United Kingdom . |
| 2002600 | 2/1979 | United Kingdom . |

Primary Examiner—Eugene R. LaRoche
Attorney, Agent, or Firm—D. R. Lackey

[57] ABSTRACT

A timing waveform generator which provides substantially noise immune timing waveforms in response to a polyphase source voltage suitable for thyristors. Each timing waveform is phase shifted from a reference sine wave using a combination of filtering and hysteresis, to achieve the total desired phase shift angle. The timing waveforms are also logically related to determine improper phase sequence and/or a missing phase.

11 Claims, 6 Drawing Figures

TIMING WAVEFORM GENERATOR

BACKGROUND OF THE INVENTION

1. Field of the Invention

The invention relates in general to timing waveform generators, and more specifically to timing waveform generators suitable for use in controlling thyristors in a power converter.

2. Description of the Prior Art

Polyphase bridge converters constructed of thyristors are used to provide an adjustable source of direct current voltage for the operation of D.C. motors. For example, a dual bridge converter may be used to provide an adjustable voltage source for the D.C. drive motor of a traction elevator system. The elevator application places stringent design parameters on the solid state converter, because elevators are required to operate satisfactorily from a normal power supply, and also from an emergency power supply. The converter is expected to satisfactorily handle the transients which may occur on the normal power supply, and it is also expected to satisfactorily handle the severe notching which is present in the waveforms of most emergency power supplies. The functions which are most likely to be adversely affected by transients and notches in the power supply are the timing waveform function, and the phase monitoring function. The timing waveforms in a converter system must be accurately related to the polyphase source voltage, in order to assure synchronism between the phase controller and the power converter. The phase controller controls the conduction or firing angle of the thyristors, and it insures that each thyristor is fired between predetermined angles or end stops. A prior art approach to reduction of distortion in timing waveforms selects an advanced signal and applies it to a phase shift circuit designed to phase shift the signal back to the desired phase position.

The phase monitoring function must correctly interpret transients or notches for what they are, and not as a loss of phase or improper phase sequence, or the power converter will be unnecessarily shut down.

Thus, it would be desirable to provide new and improved timing waveform and phase monitoring apparatus which will operate satisfactorily from a normal power supply with its power line transients, and also from an emergency power supply which may have severe notches in its waveforms.

SUMMARY OF THE INVENTION

Briefly, the present invention is a new and improved timing waveform generator which provides digital timing waveforms suitable for use by solid state power converters. The timing waveforms are accurately formed and of proper duration, notwithstanding transients and notches in the waveforms of the polyphase source. Each digital timing waveform is phase shifted to the desired angle relative to a reference sine wave in first and second steps, unlike the single step approach of the prior art. The first step includes filtering the reference sine wave to remove most of the waveform distortion in the reference sine wave. The filtering step attenuates and phase shifts the reference sine wave signal, with the filtering being selected to provide a phase shift which is slightly less than the desired phase shift. The filtered signal is then applied to a hysteresis function, which forms the second step of the phase shift and provides the desired digital timing waveform. The hysteresis function, such as a Schmitt trigger amplifier, has its threshold set to provide the remaining portion of the desired phase shift. The filtering and hysteresis steps are coordinated such that the amplitude of the distortion which remains on the signal, after the reference sine wave is filtered, is less than the threshold of the hysteresis function, to preclude multiple zero crossings of the filtered sine wave and thus prevent false digital signal generation. The present invention also includes logic means for logically relating certain of the timing waveforms to provide new and improved loss of phase, and phase sequence monitoring.

BRIEF DESCRIPTION OF THE DRAWINGS

The invention may be better understood, and further advantages and uses thereof more easily apparent, when considered in view of the following detailed description of exemplary embodiments, taken with the accompanying drawings, in which.

DESCRIPTION OF THE PREFERRED EMBODIMENT

Figure 1:
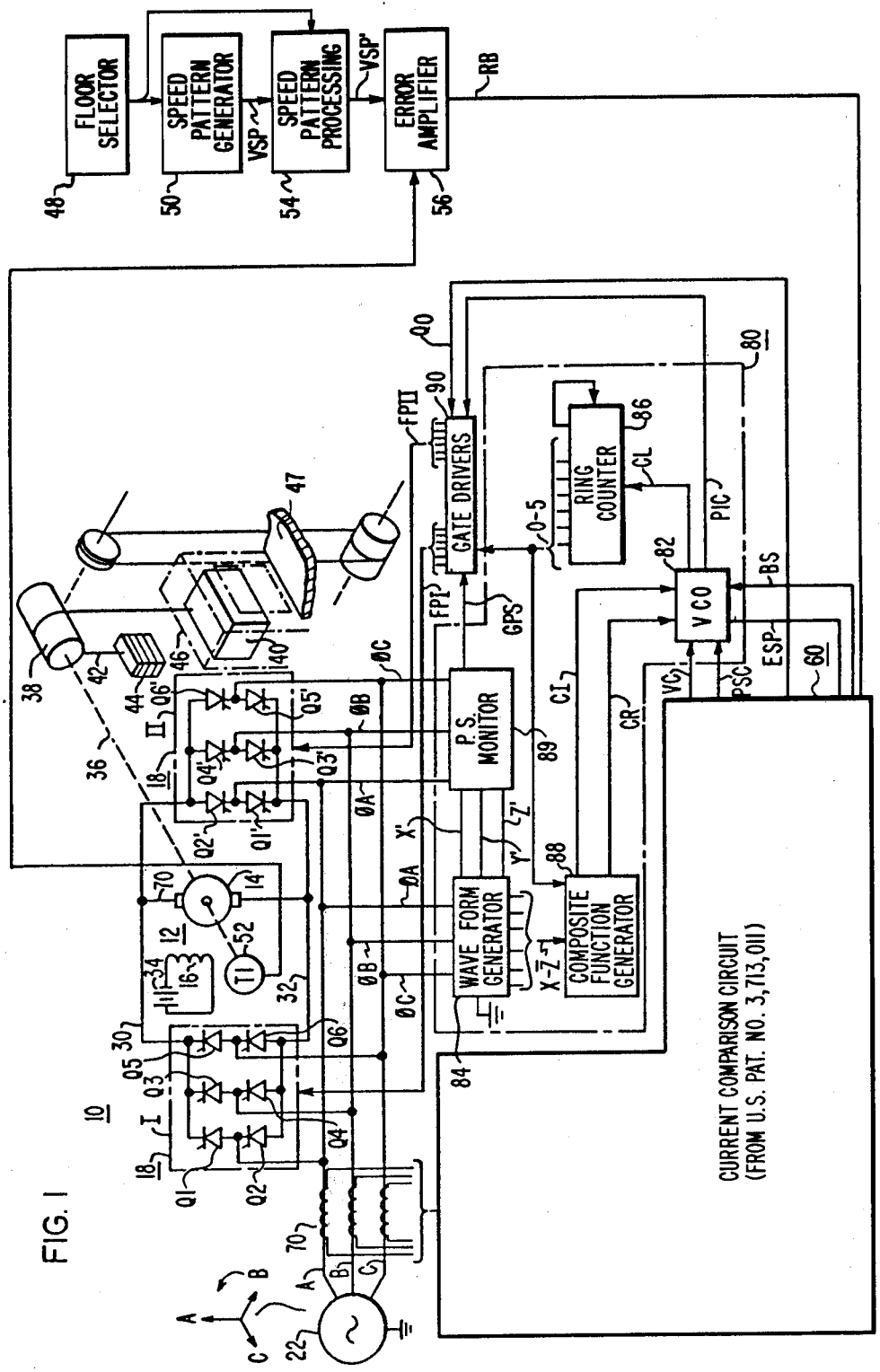
FIG. 1 is a block diagram illustrating converter apparatus of the type which may utilize the teachings of the invention.

Referring now to the drawings, and to FIG. 1 in particular, there is shown converter apparatus 10 constructed according to the teachings of the invention. Converter apparatus 10 is illustrated and will be described relative to its application in an elevator system, but the invention is equally applicable to other applications and should not be limited to the specific example set forth.

More specifically, converter apparatus 10 includes a direct current drive motor 12 having an armature 14 and a field winding 16. The armature 14 is electrically connected to an adjustable source of direct current potential. The source of potential may be a dual converter 18, as illustrated, or a single converter.

The dual converter 18 includes first and second converter banks I and II, respectively, which may be three-phase, full-wave bridge rectifiers connected in parallel opposition. Each converter includes a plurality of static controlled rectifier devices. For example, bank I includes controlled rectifier devices Q1, Q2, Q3, Q4, Q5, and Q6 connected to interchange electrical power between alternating and direct current circuits. The alternating current circuit includes a source 22 of alternating potential and line conductors A, B, and C. The direct current circuit includes buses 30 and 32, to which the armature 14 of the direct current motor is connected.

The dual bridge converter 18 not only enables the magnitude of the direct current voltage applied to armature 14 to be adjusted, by controlling the conduction or firing angle of the controlled rectifier devices, but it allows the direction of the direct current flow through the armature to be reversed when desired by selectively operating the converter banks. When converter bank I is operational, current flow in the armature 14 would be from bus 30 to bus 32, and when converter bank II is operational, the current flow would be from bus 32 to bus 30.

The field winding 16 of drive motor 14 is connected to a source 34 of direct current voltage, represented by a battery in FIG. 1, but any suitable source such as a single bridge converter may be used.

The drive motor 12 includes a drive shaft indicated generally by broken line 36, to which a traction sheave 38 is secured. An elevator car 40 is supported by a rope 42 which is reeved over the traction sheave 38, with the other end of the rope being connected to a counterweight 44. The elevator car is disposed in a hoistway 46 of a structure having a plurality of floors or landings, such as floor 47, which floors are served by the elevator car.

The movement mode of the elevator car 40 and its position in the hoistway 46 are controlled by a floor selector 48 which in turn selects the polarity of the voltage applied to the armature 14 and the drive motor 12. The magnitude of the direct current voltage applied to armature 14 is responsive to a velocity command signal VSP provided by a suitable speed pattern generator 50.

The speed pattern generator 50 provides its speed pattern VSP in response to a signal from the floor selector 48. A suitable floor selector and a suitable speed pattern generator are shown in U.S. Pat. No. 3,750,850, which is assigned to the same assignee as the present application.

A suitable control loop for controlling the speed, and thus the position of the elevator car 40 in response to the velocity command signal VSP includes a tachogenerator 52 which provides a signal responsive to the actual speed of the elevator car. The speed pattern signal VSP is processed in a processing function 54, the processed speed pattern VSP′ is compared with the actual speed signal from generator 52 in an error amplifier 56, and the output signal RB is compared with the actual current flowing in the operational converter bank via a current comparison circuit 60. A suitable speed pattern processing function is disclosed in concurrently filed application Ser. No. 061,538, entitled "Elevator System". Suitable compensation for the error signal is disclosed in U.S. Pat. No. 4,030,570, which is assigned to the same assignee as the present application.

Converter apparatus 10 is operated in a closed current loop mode, using current feedback to operate the converter essentially as a current amplifier. The current comparison circuit 60 may be the same as set forth in U.S. Pat. No. 3,713,011 and hence it is not described in detail.

The error signal VC is applied to a phase controller 80 which provides firing pulses FPI and FPII for converter banks 16 and 18, respectively. The firing pulses control the conduction angle of the controlled rectifier devices in response to the error signal VC. Bank reversal, and therefore, selection of which converter should be operational, is responsive to the switching signals $Q_0$ and $\overline{Q_0}$. In order to maintain synchronism between the phase controller 80 and the converters 16 and 18, the conduction angle is maintained between predetermined limits or end stops, which are referred to as rectification and inversion end stops. A signal ESP is provided by phase controller 80 when the inversion end stop is reached, which is applied to current comparison circuit 60. Circuit 60 provides a signal BS which forces an inversion end stop condition. The phase controller 80, certain portions of which may be constructed according to the teachings of concurrently filed application Ser. No. 061,533, entitled "Converter Apparatus", includes a voltage controlled oscillator or VCO 82, a waveform generator 84 constructed according to the teachings of the invention, a ring counter 86, a composite function generator 88, and a power supply monitor 89 which may be constructed according to the teachings of the invention. The output of the phase controller 80 is applied to gate drivers 90, which in turn provide the firing pulses FPI, or firing pulses FPII, depending upon which bank is operational. Gate drivers 90 may be the same as shown in the hereinbefore mentioned U.S. Pat. No. 3,713,011, or as described in concurrently filed application Ser. No. 061,532, entitled "Converter Apparatus".

Figure 2:
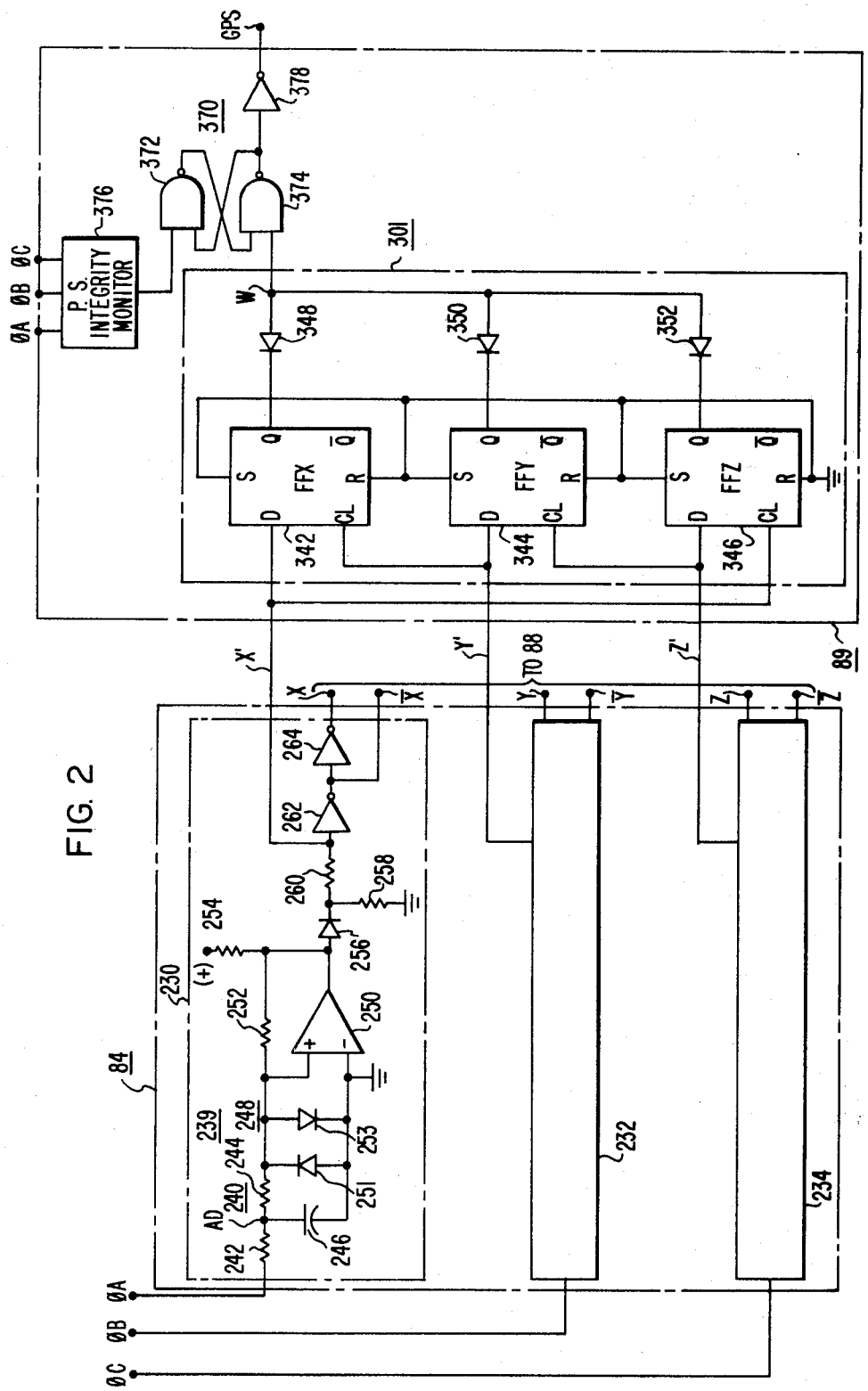
FIG. 2 is a schematic diagram which illustrates a timing waveform generator and a phase monitor constructed according to the teachings of the invention, which may be used for these functions shown in block form in FIG. 1.

FIG. 2 is a schematic diagram which illustrates a timing waveform generator 84 constructed according to the teachings of the invention, and also a power supply monitor 89 which monitors loss of phase, and phase sequence, by logically relating the timing signals in a predetermined manner.

The primary function of the waveform generator 84 is to provide logic signals which are utilized by the composite function generator 88. Each of the controlled rectifier devices Q1 through Q6 must be gated while line voltages $V_{AC}$, $V_{BC}$, $V_{BA}$, $V_{CA}$, $V_{CB}$, and $V_{AB}$ are positive, respectively. The waveform generator 84 provides logic signals related to these line voltages by starting with the phase to neutral voltages A, B, and C. The phase voltages have a predetermined angular relationship with the line voltages. Each of the phase voltages A, B, and C, i.e., the voltages from conductors A, B, and C, shown in FIG. 1 to neutral or ground, is applied to a separate phase shift circuit, such as circuits 230, 232, and 234, respectively. Since each of the circuits 230, 232, and 234 may be of like construction, only circuit 230 associated with phase voltage A is shown in detail in FIG. 3.

Figure 3:
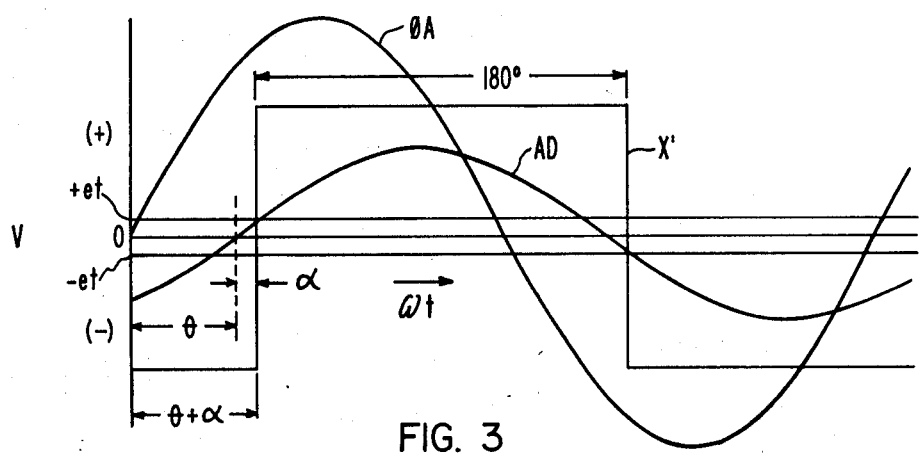
FIG. 3 is a graph which illustrates the two step phase shift process of obtaining a digital timing waveform according to the teachings of the invention.

Suitable transducer means, such as potential transformers (not shown), may provide the reference waveforms $\phi A$, $\phi B$, and $\phi C$ of the proper magnitude, which waveforms are sine waves, synchronous with the phase voltages A, B, and C. Waveform $\phi A$ is illustrated in FIG. 3, which is a graph setting forth the development of certain logic signals provided by the waveform generator 84. The development of timing waveforms in response to reference waveforms $\phi B$ and $\phi C$ would be similar, with the resulting timing waveforms being initiated 120 electrical degrees apart in the sequence A, B, and C.

More specifically, reference waveform $\phi A$ is applied to a phase shift plus hysteresis circuit 239, with the phase shift/hysteresis circuit 239 providing the total desired phase shift in two steps to provide the desired noise immunity. The first step includes a filter network 240, which attenuates and delays the reference sine wave $\phi A$ by a predetermined number of electrical degrees. The predetermined phase shift is deliberately selected to be less than the total desired phase shift. For example, if the total desired phase shift is 60°, filter network 240 may be selected to provide a phase shift 55°. As illustrated in FIG. 3, the output of filter network 240 provides a sine wave signal AD which has a smaller magnitude than the reference waveform φA, and it lags the reference waveform by an angle θ.

While the process of shifting the phase of the reference signal φA greatly attenuates most of the higher harmonics, leaving the fundamental with little distortion, the resulting signal AD contains sufficient noise that erroneous information may result if signal AD were to be applied to a high gain amplifier, or to a voltage comparator. Thus, the invention couples the filtering step with a hysteresis function 248 having a threshold which exceeds the amplitude of the remaining distortion in signal AD. In addition to selecting the threshold to exceed the high frequency ringing or noise in signal AD, it is further selected to complete the phase shift started by the filtering function. In the hereinbefore mentioned example, the hysteresis function would be selected to phase shift the zero crossing by 5°, providing a total of 55° plus 5°, or the desired 60°. In FIG. 3, signal X' represents the output of the hysteresis function 248, with signal X' being delayed by an angle α, compared with signal AD. Thus, the total phase shift between the reference waveform φA and the digital signal X' provided by the filtering and hysteresis function is $\theta + \alpha$.

Figure 4:
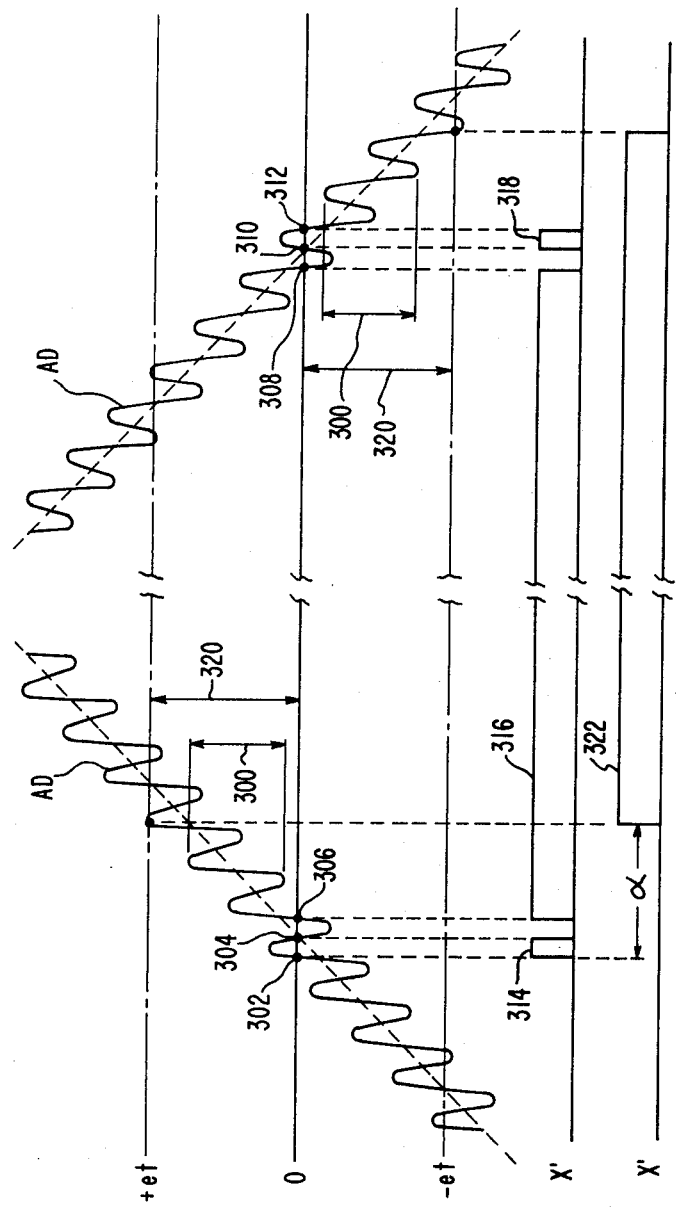
FIG. 4 is a graph which illustrates enlarged views of certain portions of a curve in FIG. 3.

FIG. 4 is a graph which illustrates the zero crossing portions of signal AD shown in FIG. 3, except greatly enlarged in order to illustrate that while the noise in signal φA is greatly attenuated by the filter step, the signal AD may contain a high frequency component having an amplitude 300. If signal AD were to be applied to a voltage comparator without hysteresis, multiple zero crossings may occur, such as those shown at 302, 304 and 306 on the positive going portion of the waveform and at 308, 310 and 312 on the negative going portion of the waveform. Thus, signal X' would go positive for a short period, to provide a signal 314, and then signal 314 would be quickly terminated, only to start again and provide another positive signal 316. A short positive signal 318 would also be provided shortly after signal 316 terminates. Thus, erroneous digital information would be provided.

Hysteresis function 248 has a predetermined positive threshold +et and a predetermined negative threshold −et, as shown in FIG. 4, with the magnitude 320 of these positive and negative threshold values exceeding the magnitude 300 of the noise component. Thus, by offsetting the switching points from the zero line, multiple zero crossings are immaterial, and signal X' will take the form shown at 322 in FIG. 4, turning on the first time waveform AD crosses the positive threshold +et, and turning off the first time waveform AD crosses the negative threshold −et. The hysteresis means 248 delays signal 322 by an angle α, compared with signal AD, with angle α being predetermined to cause the sum of the angles θ and α to equal the desired phase shift between the digital timing waveform X' and the reference signal φA.

The noise resistant timing waveform X' is converted to logic signals X and $\overline{X}$ for use by the composite function generator 88. In like manner, circuit 232 shown in FIG. 2 provides timing waveform Y' and logic signals Y and $\overline{Y}$, and circuit 234 shown in FIG. 2 provides timing waveform Z' and logic signal Z and $\overline{Z}$, for use by the composite function generator 88. Signals X, $\overline{X}$, Y, $\overline{Y}$, Z and $\overline{Z}$, and their relative positions, are set forth in FIG. 5.

Figure 5:
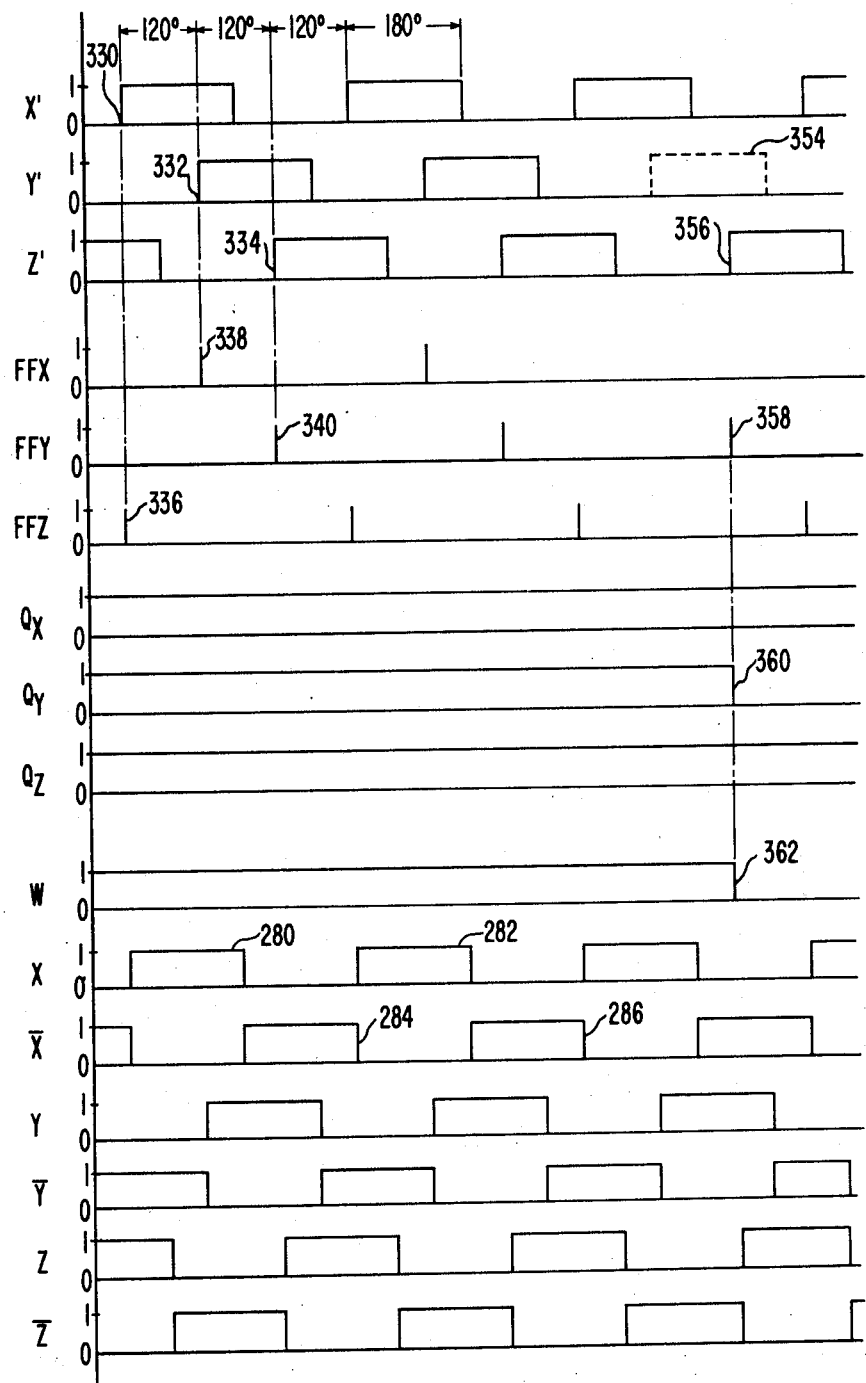
FIG. 5 is a graph which includes waveforms useful in describing the detection of loss of phase in the phase monitoring function.

Returning again to circuit 230 shown in FIG. 2, the phase shift circuit 240 may include an RC filter and phase shift circuit having resistors 242 and 244, and a capacitor 246. The output of circuit 240 is applied to a voltage comparator function 248 which may include an operational amplifier (op amp) 250 connected as a Schmitt trigger. Resistor 244 is connected to the non-inverting input of op amp 250. A feedback resistor 252 is connected from the output of op amp 250 to its non-inverting input. Its inverting input is connected to ground. Diodes 251 and 253 are required for the filter to function properly, since op amp 250 is in saturation, except during state transitions. The output of op amp 250 is connected to a positive source of unidirectional potential via a resistor 254, and also to an output terminal X via a diode 256, a resistor 260, and inverter gates 262 and 264. A resistor 258 is connected from the junction between diode 256 and resistor 260, to ground, and the junction between inverter gates 262 and 264 is connected to an output terminal $\overline{X}$. As shown in FIG. 5, terminal X provides logic signal X which is a succession of spaced logic one signals 280, 282, etc., relates to the line voltage $V_{AC}$, and its complement logic signal $\overline{X}$ provides a succession of spaced logic one signals 284, 286, etc., which appear in the "spaces" between the X logic signals.

In like manner, circuit 232 shown in block form in FIG. 2 is responsive to waveform φB, providing logic signals Y and $\overline{Y}$ shown in FIG. 5 which are related to line voltage $V_{BA}$ in the same manner in which logic signals X and X are phase related to line voltage $V_{AC}$.

Circuit 234 provides logic signals Z and $\overline{Z}$, shown in FIG. 5, in response to waveform φC, which logic signals are phase related to line voltage $V_{CB}$ in the same manner in which logic signals X and $\overline{X}$ are related to line voltage $V_{AC}$.

Each of the six logic signals X, $\overline{X}$, Y, $\overline{Y}$, Z, and $\overline{Z}$, in logic combination with the six logic signals 0 through 5 from the ring counter 86, as explained in the hereinbefore mentioned concurrently filed application entitled "Converter Apparatus", provide the rectification and inversion end stops for the six controlled rectifier devices of the three-phase full-wave bridge rectifiers I and II of the dual bridge converter 18.

In addition to providing noise resistant, digital timing signals X through $\overline{Z}$, properly synchronized with the waveforms of the polyphase source 22 of alternating potential, the present invention discloses how the timing signals may be used to provide a low cost but reliable loss of phase, and/or improper phase sequence, monitor or detector. The timing signals X', Y', and Z' are initiated 120 electrical degrees apart, in the sequence X', Y', and Z', when the phase rotatin is proper. Further, once initated, the timing signals persist for a period of time greater than 120 electrical degrees, for example 180°. Thus, each time that a timing signal is initiated, or terminated, there should be a specific timing waveform present from a selected one of the other two phases. The present invention logically relates appropriate timing waveforms to providing a signal W which is at a predetermined first logic level when there is no loss of phase and the phasor rotation sequence is proper, and it is otherwise at a second logic level. When signal W is at the second logic level, it may be used to inhibit or abort operation, for example.

More specifically, FIG. 5 illustrates the timing signals X', Y' and Z', and their relationships. When signal X' goes high at 330, timing signal Z' should be at the logic one level. When signal Y goes high at 332, timing signal X' should be at a logic one level. When timing signal Z' goes high at 334, timing signal Y' should be a logic one. Thus, these positive going edges at times 330, 332, and 334 may be used to provide signals FFZ, FFX, and FFY which interrogate or check for timing signals Z', X' and Y', respectively. Signals FFZ, FFY, and FFX responsive to edges 330, 332, and 334 are shown at 336, 338, and 340 in FIG. 5. An embodiment of the invention in which the leading edges of the timing signals are used for interrogation purposes is implemented in FIG. 2. However, it is to be understood that the negative going edges of timing signals X', Y', and Z' may be used to generate the interrogation signals, which in this instance would interrogate or check for timing signals Y', Z', and X', respectively.

More specifically, the power supply monitor 89 includes a phase monitoring function 301 which includes first, second and third memory elements, such as flip-flops 342, 344, and 346. These flip-flops may be data or D-type flip-flops which transfer the logic level appearing at the D input to the Q output during the positive going transition of a clock pulse applied to the clock input CL. RCA's. CD4013 is an example of a suitable D-type flip-flop which may be used.

The timing waveforms X', Y', and Z' are applied to the D inputs of flip-flops 342, 344, and 346, respectively. The timing waveforms are also used to provide a clock input for a selected one of the other flip-flops, depending upon which timing waveform provides the signal which interrogates or looks for the specific timing waveform from another phase. As hereinbefore stated, when the leading edges of the timing waveforms are used to provide the clock signals, the leading edge of timing signal X' checks for the presence of timing signal Z', the leading edge of timing signal Y' checks for the presence of timing signal X' and the leading edge of timing signal Z' checks for the presence of timing signal Y'. Thus, signal X' is additionally connected to the clock input CL of flip-flop 346, signal Y' is additionally connected to the clock input CL of flip-flop 342, and signal Z' is additionally connected to the clock input C1 of flip-flop 344. As long as the logic level at the D input is high each time each flip-flop is clocked, the Q outputs of all the flip-flops will remain high and the Q outputs may thus be logically related to provide a single signal W which is at a first logic level when the Q outputs are all high, and at a second logic level when one or more of the Q outputs are low. As illustrated in FIG. 2, first, second and third diodes, 348, 350, and 352 may have their cathodes connected to the Q outpts of flip-flops 342, 344, and 346, respectively, and their anodes connected in common to output terminal W. As long as the Q outputs are high, signal W will be high. Should any Q output go low, output terminal W will also go low. Alternatively, instead of using diodes, the three Q outputs of the flip-flops may each be connected to an input of a three-input AND gate.

FIG. 5 illustrates loss of phase Y' at 345. Thus, when timing signal Z' goes high at 356 to provide a clock signal 358 for checking for the presence of timing signal Y', flip-flop 344 will have a logic zero input and the output Q of flip-flop 344 will go low at 360, and signal W will simultaneously go low at 362.

Figure 6:
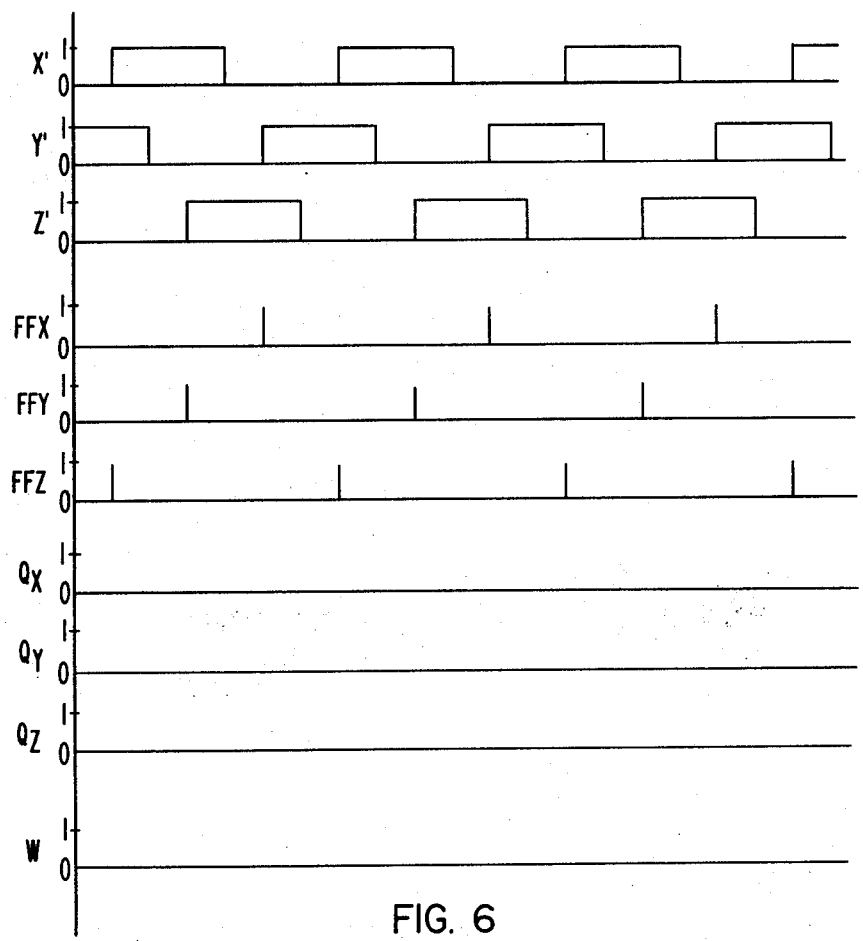
FIG. 6 is a graph which includes waveforms useful in describing the detection of improper phase sequence in the phase monitoring function.

If the phase sequence is improper, the flip-flops will always have a logic zero at its B input when clocked, their Q outputs will all be zero, and signal W will also be zero. FIG. 6 is a graph which illustratesthis operation of a phase monitoring function for the improper sequence A, C, B (X', Z', Y').

In order to prevent signal W from alternating between logic levels when the power supply is erratic, it may be desirable to have signal W operate a memory element of flip-flop 370, such as one formed of cross-coupled NAND gates 372 and 374. Signal W provides one of the inputs, and a power supply integrity monitoring function 376 may be connected to the other input. The power supply integrity monitor 376 may monitor reference waveforms $\phi A$, $\phi B$, and $\phi C$ and provide a timing function as a result of a discontinuity in any of the waveforms. For example, its output may be a logic zero when the power supply is operating normally, and a logic one when it is not. The logic zero output would enable signal W to trigger flip-flop 374 when signal W returns from a logic zero state. A logic one output from the monitor 376 would prevent signal W from triggering the flip-flop 370 when it comes back to the logic one state.

The monitoring function 376 may be arranged such that a discontinuity which is so short that it has no relevance would be overridden, while a discontinuity of consequence will change its output to a logic one and start a timing circuit which requires that the power supply return to normal operation for a predetermined period of time before the monitor output will return to a zero. Thus, the loss and the reappearance of the logic one at output terminal W will not reenable the gate drivers 90 unless monitor 376 has determined that the power supply disturbance has ceased. Application Ser. No. 748,255, filed Dec. 6, 1976, entitled "Elevator System", now U.S. Pat. 4,155,427, which is assigned to the same assignee as the present application, describes a suitable timing function for monitoring a power supply which may be used for the power supply integrity monitor 376.

An inverter 378 may be connected to the output of NAND gate 374 to provide a signal GPS which may be used by logic circuitry associated with the gate drivers 90, for example. As long as signal GPS is high, system operation is enabled. When signal GPS goes low, system operation is inhibited.

In summary, there has been disclosed a new and improved timing waveform generator which is noise resistant, and which is precluded from generating false digital information. The timing signal is generated in two steps, with the first step phase shifting the reference signal by a predetermined angle, which is less than the total desired phase shift. A hysteresis function completes the phase shift while insuring that the digital information provided is accurate. The invention further discloses how the digital timing signals may be logically related to provide a power supply loss of phase, and phase sequence monitor.

I claim as my invention:
1. A timing waveform generator, comprising:
   a source of alternating potential,
   transducer means providing a first sine wave signal synchronous with said source of alternating potential,
   and phase shift means providing timing waveform which lags said first sine wave by a predetermined angle, said phase shift means including filter means and hysteresis means, said filter means filtering said first sine wave signal to provide a second sine wave signal which lags the first sine wave signal by a first angle, with the filter means being selected such that the first angle is less than said predetermined angle, said hysteresis means generating said timing waveform in response to said second sine wave signal, with said hysteresis means having a predetermined threshold selected to delay the timing waveform by a second angle which is equal to the predetermined angle minus the first angle to cause the timing waveform to lag the first sine wave by said predetermined angle.

2. The timing waveform generator of claim 1 wherein the second sine wave signal has a noise component having a predetermined amplitude, with the magnitude of the predetermined threshold of the hysteresis means exceeding said noise amplitude.

3. The timing waveform generator of claim 1 wherein the filter means includes an RC filter network, and the hysteresis means includes voltage comparator means responsive to the second sine wave signal which has turn-on and turn-off thresholds selected to provide the second predetermined angle.

4. The timing waveform generator of claim 3 wherein the voltage comparator means includes amplifier means connected as a Schmitt trigger to provide a square wave timing waveform in digital form which is phase shifted from the first sine wave signal by the predetermined angle.

5. The timing waveform generator of claim 1 wherein the source of alternating potential is a three-phase source, with the transducer means providing a first sine wave signal relative to each phase voltage, and with the phase shift means providing a timing waveform which lags each of the first sine waves by the predetermined angle.

6. The timing waveform generator of claim 5 wherein the timing waveforms are initiated 120 electrical degrees apart, with each having a duration greater than 120 electrical degrees, and including phase monitoring means which logically relates a predetermined edge of each timing waveform with a predetermined one of the remaining timing waveforms, with said phase monitoring means providing a signal indicative of an improper relationship.

7. The timing waveform generator of claim 5 wherein the timing waveforms are initiated 120 electrical degrees apart, with each having a duration exceeding 120 electrical degrees, and including phase monitoring means which provides a signal having a first logic level when the timing waveforms are all present and they appear in the proper sequence, and otherwise a second logic level.

8. The timing waveform generator of claim 5 wherein the timing waveforms include first, second, and third waveforms initiated 120 electrical degrees apart, with each having a duration greater than 120 electrical degrees, and including phase monitoring means which includes first, second, and third flip-flops, with the first, second, and third timing waveforms providing data inputs for the first, second, and third flip-flops, respectively, and clock inputs to a predetermined different flip-flop, such that with all timing waveforms appearing in the proper sequence, each flip-flop will be clocked while a timing waveform appears at its data input, and means logically relating the outputs of the first, second and third flip-flops to provide a signal which indicates when a flip-flop is clocked in the absence of a timing waveform at its data input.

9. A timing waveform generator, comprising:
a three-phase source of alternating potential,
means providing first, second, and third digital timing signals 120 electrical degrees apart in response to the three phases of said three-phase source, with said timing signals having a duration which exceeds 120 electrical degrees,
phase monitoring means which logically relates a predetermined edge of each timing waveform with a predetermined one of the remaining timing waveforms, with said phase monitoring means providing a signal indicative of an improper relationship.

10. The timing waveform generator of claim 9 wherein the phase monitoring means provides a signal having a first logic level when the timing waveforms are all present and in the proper sequence, and otherwise a second logic level.

11. The timing waveform generator of claim 9 wherein the phase monitoring means includes first, second and third flip-flops, with the first, second, and third timing waveforms providing data inputs for the first, second, and third flip-flops, respectively, and clock inputs to a predetermined different flip-flop, such that with all timing waveforms appearing in the proper sequence, each flip-flop will be clocked while the timing waveform is present at its data input, and means logically relating the outputs of the first, second, and third flip-flops to provide a signal which indicates when a flip-flop is clocked in the absence of a timing waveform at its data input.

* * * * *